(12) United States Patent
Iizuka et al.

(10) Patent No.: US 7,434,645 B2
(45) Date of Patent: Oct. 14, 2008

(54) SWING ARM STRUCTURE IN MOTORCYCLE

(75) Inventors: Chikashi Iizuka, Saitama (JP); Hiroyuki Tanaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 385 days.

(21) Appl. No.: 11/269,538

(22) Filed: Nov. 9, 2005

(65) Prior Publication Data

US 2006/0102406 A1 May 18, 2006

(30) Foreign Application Priority Data

Nov. 12, 2004 (JP) ............................. 2004-328871
Dec. 10, 2004 (JP) ............................. 2004-357751

(51) Int. Cl.
*B62K 11/02* (2006.01)
(52) U.S. Cl. ..................... 180/227; 180/228; 280/284; 280/285
(58) Field of Classification Search ................. 180/227, 180/228; 280/284, 285
See application file for complete search history.

(56) References Cited

U.S. PATENT DOCUMENTS

| | | | |
|---|---|---|---|
| 4,345,664 A * | 8/1982 | Anno et al. ................. | 180/230 |
| 6,808,465 B2 * | 10/2004 | Kuga et al. ................ | 474/14 |
| 6,986,400 B2 * | 1/2006 | Osada ....................... | 180/228 |
| 7,182,167 B2 * | 2/2007 | Sasamoto .................. | 180/219 |
| 2001/0034280 A1 * | 10/2001 | Kuga et al. ................ | 474/8 |
| 2002/0027034 A1 * | 3/2002 | Tsutsumikoshi ........... | 180/227 |

FOREIGN PATENT DOCUMENTS

| JP | 11-301563 | * | 2/1999 |
|---|---|---|---|
| JP | 11-342754 A | | 12/1999 |
| JP | 2004-122864 A | | 4/2004 |

* cited by examiner

*Primary Examiner*—Lesley D. Morris
*Assistant Examiner*—Marlon A Arce Diaz
(74) *Attorney, Agent, or Firm*—Birch, Stewart, Kolasch & Birch, LLP

(57) ABSTRACT

A structure for supporting a swing arm in a motorcycle is provided in which a power unit swingably supports a front portion of the swing arm via a first pivot of a cylindrical shape that is coaxial with an output shaft of the power unit and a second pivot that is coaxial with the first pivot. The number of parts used are reduced and the removal and installation of the swing arm is facilitated. An output shaft, an outer end portion of which projects outwardly of a swing arm, is connected to a final transmission member of a reduction transmission and is capable of removal or insertion in an axial direction, while being incapable of relative rotation about an axis. A first pivot is removably mounted on a power unit. A second pivot is removably secured to the power unit PA or the swing arm.

16 Claims, 10 Drawing Sheets

SWING ARM STRUCTURE IN MOTORCYCLE

CROSS-REFERENCE TO RELATED APPLICATIONS

The present application claims priority under 35 USC 119 to Japanese Patent Application No. 2004-328871 filed on Nov. 12, 2004 and Japanese Patent Application No. 2004-357751 filed on Dec. 10, 2004 the entire contents of which are hereby incorporated by reference.

1. Field of the Invention

The present invention relates to a structure for supporting a swing arm for a motorcycle, in which a power unit mounted on a vehicle body frame swingably supports a front portion of a swing arm, a rear portion of which journals a rear wheel via a first pivot of a cylindrical shape coaxial with an output shaft. In addition, a second pivot is coaxial with the first pivot. The power unit includes an engine and a reduction transmission apparatus that includes the output shaft for providing a driving force to a rear wheel. The reduction transmission apparatus is provided for transmitting an output of the engine through speed reduction.

The present invention also relates to a structure for supporting a swing arm in a motorcycle, the structure including a pair of right and left support arm portions extending forwardly and being disposed at a front portion of the swing arm for journaling a rear wheel in a rear portion, the pair of support arm portions being swingably supported on swing arm support means disposed therebetween via a shaft member.

2. Description of Background Art

A structure for supporting a swing arm is known. For example, as disclosed in Japanese Patent Laid-open No. Hei 11-342754. The structure is arranged to have a front portion of a swing arm swingably supported by a power unit on a pair of pivots disposed coaxially with an output shaft of a power unit on both right and left sides of the power unit.

However, in the structure for supporting the swing arm as disclosed in Japanese Patent Laid-open No. Hei 11-342754, the output shaft is supported on a casing of the power unit in a condition, in which the output shaft is restricted from axial movement in an assembly completed state of the power unit. In this condition, a first pivot having the output shaft coaxially passed therethrough is removably secured to the power unit and a second pivot secured to the front portion of the swing arm is fitted in, and supported by, the power unit by being capable of rotation about an axis. More specifically, the fixing of the first pivot to the power unit is released and then the second pivot is disengaged from the swing arm and the power unit by releasing the fixing onto the swing arm. Even if this is done, it is not possible to install the swing arm to, or remove the swing arm from, the power unit in a structure having the swing arm integrated therewith. To permit installation and removal, therefore, the swing arm is divided into a right-hand half and a left-hand half. This results in the number of parts used being increased. The arrangement also makes it troublesome to install the swing arm to, and remove the swing arm from, the power unit.

A structure for supporting a swing arm in a motorcycle is known as disclosed, for example, in Japanese Patent Laid-open No. 2004-122864. The structure includes a pair of support arm portions disposed at a front portion of the swing arm. The pair of support arm portions is swingably supported on a shaft member disposed between a power unit disposed between the pair of support arm portions and a vehicle body frame disposed outwardly of the pair of support arm portions.

In the swing arm support structure disclosed in Japanese Patent Laid-open No. 2004-122864, the shaft member is supported by the power unit and the vehicle body frame is disposed outwardly of the swing arm. This arrangement ensures the rigidity of the shaft member, which provides a favorable behavior for the swing arm while the motorcycle is being operated. Such a support structure nonetheless requires that the vehicle body frame be disposed outwardly of the swing arm. There is, however, a need for securing a degree of freedom in design by not disposing the vehicle body frame outwardly of the swing arm. In this case, too, it is expected that rigidity of the same level as the support structure disclosed in Japanese Patent Laid-open No. 2004-122864 will be achieved.

SUMMARY AND OBJECTS OF THE INVENTION

In view of the foregoing, it is an object of an embodiment of the present invention to provide a structure for supporting a swing arm in a motorcycle, in which a sufficient rigidity of a shaft member can be achieved, while achieving a degree of freedom in design by eliminating the need for setting, as an indispensable prerequisite, the arrangement of the swing arm disposed between a power unit and a vehicle body frame placed either outside or inside thereof, respectively.

It is an object of an embodiment of the present invention to provide a structure for supporting a swing arm in a motorcycle, the structure allowing the swing arm to be supported on a power unit, while achieving a reduced number of parts used and facilitating removal and reinstallation procedures performed for the swing arm relative to the power unit.

To achieve the foregoing object, an embodiment of the present invention provides a structure for supporting a swing arm in a motorcycle, in which a power unit mounted on a vehicle body frame swingably supports a front portion of a swing arm, a rear portion of which journals a rear wheel, via a first pivot of a cylindrical shape coaxial with an output shaft and a second pivot coaxial with the first pivot. The power unit includes an engine and a reduction transmission apparatus that includes the output shaft for giving a driving force to the rear wheel. The reduction transmission apparatus is provided for transmitting an output of the engine through speed reduction. The structure includes the output shaft that has an outer end portion protruding outwardly from the swing arm that is connected to a final transmission member of the reduction transmission by being capable of removal or insertion in an axial direction, while being incapable of relative rotation about an axis. The first pivot is removably mounted on the power unit and the second pivot is removably secured to the power unit or the swing arm.

In an embodiment of the present invention, the second pivot is removably secured to the power unit or the swing arm by being disengageable axially from the power unit in a fixing released condition.

In an embodiment of the present invention, the swing arm is molded integrally.

In an embodiment of the present invention, an output shaft holder for rotatably supporting the outer end portion of the output shaft is removably mounted on a front portion of the swing arm so as to cover the outer end portion of the output shaft.

In an embodiment of the present invention, a pivot holder capable of fixedly holding an outer end portion of the second pivot that passes through the swing arm is screwed in the power unit and is removably mounted onto a plurality of boss portions disposed in the power unit at a portion outside a swing motion range of the swing arm.

According to an embodiment of the present invention, the output shaft of the power unit is connected to the final transmission member of the reduction transmission apparatus by being capable of removal or insertion in the axial direction thereof. The output shaft can therefore be axially removed from, or inserted in, the power unit. Further, the first pivot is removably mounted on the power unit and the second pivot is removably secured to the power unit or the swing arm. To remove the swing arm from the power unit, the following steps are performed. More specifically, disengaging the output shaft from the power unit, releasing the fixing of the first pivot relative to the power unit, and disengaging the second pivot from the power unit are performed in that order. The swing arm can then be removed from the power unit. To reinstall the swing arm in the power unit, therefore, it is only necessary to reverse the order of removal. This contributes to easy steps for removal and reinstallation. The arrangements also eliminate the need for dividing the swing arm, thus reducing the number of parts used.

According to an embodiment of the present invention, during removal or installation of the swing arm relative to the power unit, the second pivot can be disengaged from the power unit so as to prevent the second pivot from impeding the removal or installation procedures. This enhances workability of the removal and installation procedures.

According to an embodiment of the present invention, the swing arm is integrally molded. This not only reduces the number of parts used, but also enhances assembly accuracy of the swing arm relative to the power unit. The arrangement also eliminates the need for a fastening structure for assembling the swing arm by joining several different members with bolts or the like. This contributes to an even greater rigidity of the swing arm itself and a reduced weight of unsprung weight.

According to an embodiment of the present invention, the output shaft holder that serves as a supporting member and a covering member for the output shaft is removably mounted on the front portion of the swing arm. This enhances the appearance and provides a more positive support for the output shaft.

According to an embodiment of the present invention, a dual support structure of the second pivot to the power unit can be realized and the number of parts used for preventing the second pivot screwed in the power unit from coming loose can be minimized. This not only enhances the supporting rigidity of the second pivot on the power unit, but also stabilizes even further a swing motion support for the swing arm.

To achieve an object of an embodiment of the present invention, a structure for supporting a swing arm in a motorcycle is provided wherein the structure includes a pair of right and left support arm portions extending forwardly and disposed at a front portion of the swing arm for journaling a rear wheel in a rear portion. The pair of support arm portions are swingably supported on swing arm support means disposed therebetween via a shaft member, wherein an outer end portion of the shaft member passing through at least one of the pair of right and left support arm portions is held by a shaft holding member removably mounted on the swing arm support means.

In an embodiment of the present invention, the swing arm support means include a power unit mounted in a vehicle body frame so as to drive the rear wheel.

In an embodiment of the present invention, the shaft holding member is formed substantially into a circular shape so as to let the outer end portion of the shaft member pass therethrough and includes a holding portion having a slit at one circumferential place therein. The shaft member is held in position by the shaft holding member by tightening a bolt that traverses the slit and is screwed in the holding portion.

In an embodiment of the present invention, the swing arm support means include a plurality of boss portions for removably mounting the shaft holding member. The boss portion that overlaps with the swing arm in a top view thereof is disposed at a position that falls outside a range of the swinging motion of the swing arm.

In an embodiment of the present invention, at least part of the plurality of boss portions is disposed in the swing arm support means so as to project outwardly from the swing arm.

In an embodiment of the present invention, at least either one of a pair of the boss portions disposed in the swing arm support means at a position sandwiching the swing arm from upper and lower directions thereof includes a plurality of fastening seats for fastening the shaft holding member. A position of each of the fastening seats is established such that a distance from a center of the shaft member to each of the fastening seats is smaller with a forwardly positioned fastening seats.

According to an embodiment of the present invention, the outer end portion of the shaft member passing through at least one of the pair of right and left support arm portions is held by the shaft holding member removably mounted on the swing arm support means. The rigidity of the shaft member can be enhanced with a simple structure, in which the shaft member is supported by the swing arm support means and the shaft holding member. It is also possible to adjust the rigidity of the shaft holding member, thus allowing the rigidity of the shaft member to be adjusted to a precise value established in accordance with an applicable vehicle model. Moreover, the simplified structure keeps the increase in weight and cost relatively low and allows the swing arm support means to be disposed on the inside of the swing arm. Thus, the degree of freedom in vehicle body layout can thus be increased.

According to an embodiment of the present invention, a need is eliminated for disposing the vehicle body frame at a point near a swing motion support portion of the swing arm. Thus, a stabilized swing motion can be achieved by the swing arm by making use of rigidity of the power unit.

According to an embodiment of the present invention, the outer end of the shaft member can be positively held in position with the shaft holding member of a simple structure for an enhanced rigidity of the shaft member. Moreover, it is easy to perform operations of holding and releasing the hold of the shaft member.

According to an embodiment of the present invention, the shaft member can be positively secured in position, while providing a swing motion stroke for the swing arm. It is also possible to build the shaft holding member more compactly. All this contributes to a reduced cost.

According to an embodiment of the present invention, the shaft holding member can be configured compactly by keeping projections and indentations thereof to a minimal. Accordingly, the shaft holding member may also be manufactured through, for example, press forming.

According to an embodiment of the present invention, a plurality of fastening seats are provided for at least either one of the pair of the boss portions. This enables positive fixing of the shaft holding member to the boss portions. The shaft holding member can be efficiently and compactly disposed, while securing a clearance from the swing arm.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Specific embodiments to which the present invention is applied will be described below with reference to the accompanying drawings.

Figure 1:
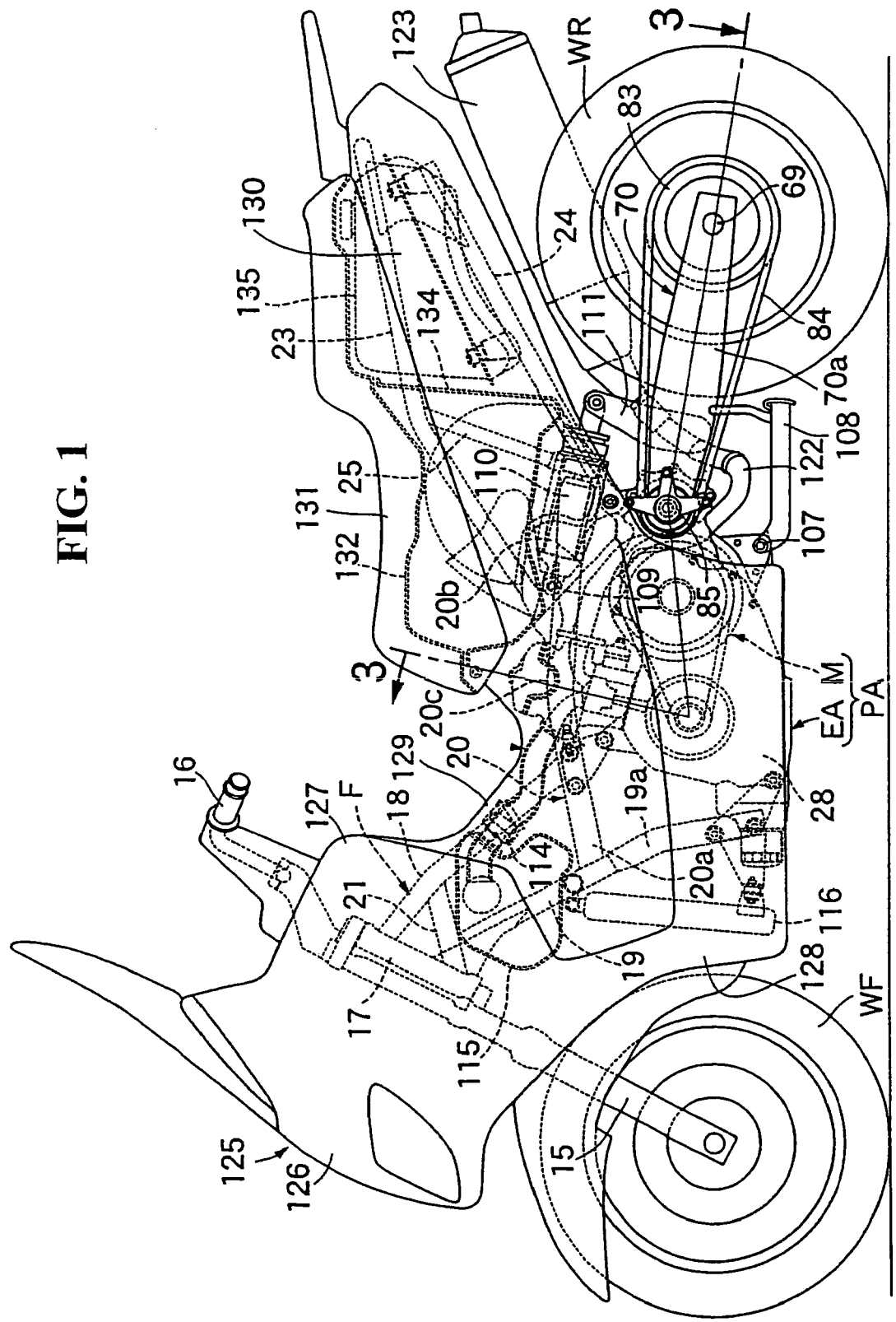
FIG. 1 is a side elevational view showing a motorcycle according to a first embodiment of the present invention.

Referring to FIG. 1, a vehicle body frame F of a scooter type motorcycle includes a head pipe 17, a pair of right and left down pipes 18 . . . , a pair of right and left lower pipes 19 . . . and a pair of right and left main pipes 20 . . . . The head pipe 17 steerably supports a front fork 15 that journals a front wheel WF and a steering handlebar 16 connected to the front fork 15. The down pipes 18 . . . extend rearwardly and downwardly from the head pipe 17. The lower pipes 19 . . . are provided in a connected row arrangement to the head pipe 17 below the down pipes 18 . . . , extending rearwardly and downwardly with an inclination sharper than the down pipes 18 . . . . The main pipes 20 . . . are connected to lower ends of the lower pipes 19 . . . and extend rearwardly. Further, rear ends of the down pipes 18 . . . are connected to an intermediate portion of the main pipes 20 . . . .

Engine hanger brackets 19a are joined to a lower end of the lower pipes 19 . . . . The engine hanger brackets 19a extend in an extension direction of the lower pipes 19 . . . . The main pipes 20 . . . extend rearwardly from a point near a joint between the lower pipes 19 . . . and the engine hanger brackets 19a . . . . Reinforcement connecting boards 21 . . . are disposed in an intermediate portion between the down pipes 18 . . . and the lower pipes 19 . . . .

Figure 2:
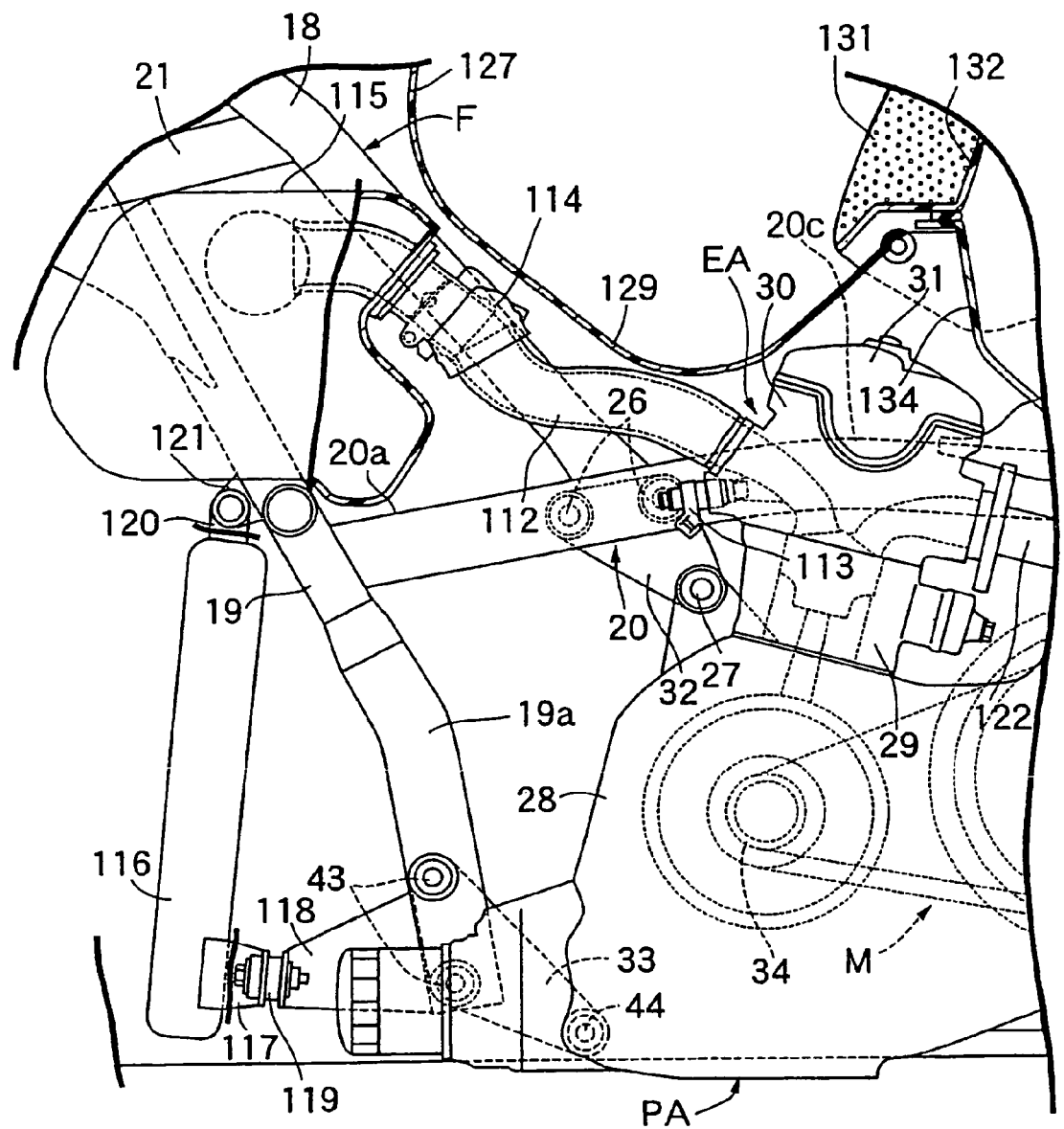
FIG. 2 is an enlarged longitudinal cross-sectional view showing a front portion of the motorcycle.

Referring to FIG. 2, the main pipe 20 is formed, for example, by a front half inclined portion 20a, a rear half inclined portion 20b, and a curved portion 20c, each integrated together with each other. The front half inclined portion 20a extends rearwardly and upwardly from a lower end of the lower pipe 19. The rear half inclined portion 20b extends rearwardly and downwardly. The curved portion 20c curves so as to project upwardly and connects a rear end of the front half inclined portion 20a with a front end of the rear half inclined portion 20b. The main pipe 20 is a substantially rectangular tube having a length in a vertical direction longer than a length in a lateral direction. Further, a lower end of the down pipe 18 is joined through welding to an intermediate portion of the front half inclined portion 20a.

A front end of a seat rail 23 that extends upwardly and rearwardly is connected to a front portion of the rear half inclined portion 20b. Rear portions of a pair of right and left seat rails 23 . . . are integrally joined together. Rear ends of rear pipes 24 . . . are joined through welding to the rear portions of the seat rails 23. . . . The rear pipes 24 . . . extend rearwardly and upwardly with their front ends joined to rear ends of the rear half inclined portions 20b . . . . In addition, there are disposed reinforcement connecting boards 25 . . . in an intermediate portion between the seat rails 23 . . . and the rear pipes 24

The vehicle body frame F also includes a power unit PA that includes a four-cycle engine EA and a reduction transmission M. The reduction transmission M transmits the output from the engine EA to a rear wheel WR through a required speed reduction. The engine EA may, for example, be formed as a water-cooled single-cylinder configuration. The engine EA includes a crankcase 28, a cylinder block 29, a cylinder head 30, and a head cover 31. The cylinder block 29 has a cylinder axis extending vertically and extending upwardly from the crankcase 28. The cylinder head 30 is connected to an upper end of the cylinder block 29. The head cover 31 is connected to a vertex of the cylinder head 30.

First engine hangers 32 . . . are disposed in the front half inclined portions 20a of the main pipes 20 . . . at a point near the lower ends of the down pipes 18 . . . in the vehicle body frame F. An upper portion of the crankcase 28 is supported by the first engine hangers 32 . . . at a point forward of the cylinder block 29 in the engine EA. The cylinder block 29 and the cylinder head 30 are disposed between the curved portions 20c . . . of the main pipes 20 . . . . Second engine hangers 33 . . . are attached, using a pair of bolts 43 . . . , to lower ends of the engine hanger brackets 19a . . . that connect to the lower ends of the lower pipes 19 . . . . A lower portion on a front side of the crankcase 28 is joined to the second engine hangers 33 . . . with a bolt 44 and is supported by the second engine hangers 33 . . . .

As described in the foregoing, the engine EA can be supported by the main pipes 20 . . . at a portion having a high rigidity. Moreover, the first engine hangers 32 . . . are disposed on the front half inclined portions 20a . . . of the main pipes 20 . . . by fastening with a pair of bolts 26 . . . that sandwiches, from both sides, an extension line from a centerline of the down pipes 18 . . . . The crankcase 28 of the engine EA is supported on the first engine hangers 32 . . . through fastening of a bolt 27 disposed on an extension line of a centerline of the down pipes 18 . . . . As such, the crankcase 28 is supported on the first engine hangers 32 . . . efficiently and with an enhanced rigidity.

Figure 3:
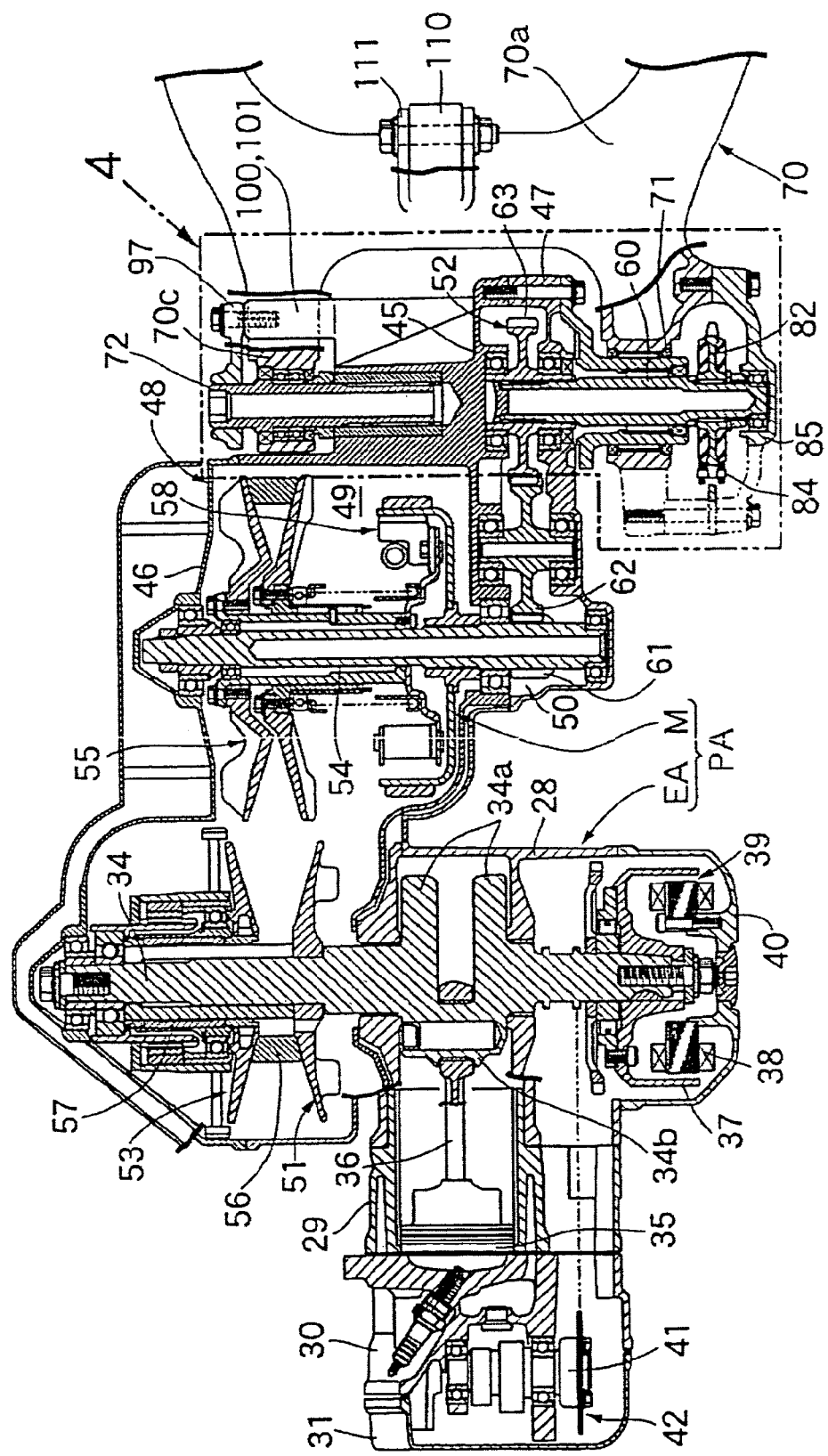
FIG. 3 is a cross-sectional view taken along line 3-3 of FIG. 1.

Referring to FIG. 3, a crankshaft 34 that is rotatably supported on the crankcase 28 includes, as integral parts thereof, a pair of crank webs 34a, 34a and a crankpin 34b connecting the crank webs 34a, 34a. A piston 35 that is slidably fitted in the cylinder block 29 is connected to the crankpin 34b between the crank webs 34a, 34a via a connecting rod 36.

One end of the crankshaft 34 projects from the crankcase 28 on the left-hand side along a direction of travel of the motorcycle. An AC generator 39 is formed by a rotor 37 fixed to the one end of the crankshaft 34 and a stator 38 accommodated in the rotor 37. The AC generator 39 is covered with a left cover 40 that is joined to the crankcase 28. The stator 38 is secured to the left cover 40.

A camshaft 41 is rotatably supported on the cylinder head 30 so as to form part of a valve train for opening or closeing an intake valve and an exhaust valve (not shown) disposed in the cylinder head 30. There is disposed a timing control transmission 42 between the camshaft 41 and the crankshaft 34 between the crankcase 28 and the AC generator 39. The timing control transmission 42 reduces the speed of a rotational driving force of the crankshaft 34 to half before the power is transmitted to the camshaft 41.

A case main body 45 is connected to the crankcase 28 on the right-hand side along the direction of travel of the motorcycle. The case main body 45 extends rearwardly from the crankcase 28. A right cover 46 joined to the right of the case main body 45, a gear case 47 joined to the right in the rear of the case main body 45, and the case main body 45 constitute a transmission case 48. Further, a transmission chamber 49 is formed between the case main body 45 and the right cover 46. A gear chamber 50 is formed between the case main body 45 and the gear case 47.

The reduction transmission M includes a belt-type continuously variable transmission 51, a reduction gear train 52, and an output shaft 60. The continuously variable transmission 51 infinitely varies a speed ratio of the rotational driving force of the crankshaft 34. The reduction gear train 52 reduces the speed of an output from the continuously variable transmission 51. The output shaft 60 provides the driving force, the speed of which has been reduced by the reduction gear train 52, to the rear wheel WR. The continuously variable transmission 51 is housed in the transmission chamber 49. The reduction gear train 52 is housed in the gear chamber 50.

The continuously variable transmission 51 includes a drive pulley 53, a driven pulley 55, and an endless belt 56. The drive pulley 53 is mounted on the other end of the crankshaft 34 facing the transmission chamber 49. The driven pulley 55 is mounted on a portion of a transmission shaft 54 facing the transmission chamber 49. The transmission shaft 54 has an axis that runs in parallel with the crankshaft 34 and is rotatably supported by a rear portion of the transmission case 48. The endless belt 56 is wound around the drive pulley 53 and the driven pulley 55.

The drive pulley 53 varies a winding radius of the belt 56 through a sliding motion of a slide tube 57 that slides in an axial direction of the crankshaft 34 by an operation of an electric motor or the like not shown. The driven pulley 55, on the other hand, varies the winding radius of the belt 56 toward a side opposite to that of the drive pulley 53 according to the change in the winding diameter of the belt 56. A centrifugal clutch 58 is inserted between the driven pulley 55 and the transmission shaft 54.

A distal end of the transmission shaft 54 is disposed so as to face the gear chamber 50. The reduction gear train 52 accommodated in the gear chamber 50 includes a drive gear 61, an idle gear 62, and a driven gear 63. The drive gear 61 is integrally formed on the distal end of the transmission shaft 54. The idle gear 62 is in mesh with the drive gear 61. The driven gear 63 is in mesh with the idle gear 62. The idle gear 62 and the driven gear 63 are supported by the case main body 45 and the gear case 47, respectively, rotatably about axes that run in parallel with the transmission shaft 54.

Figure 4:
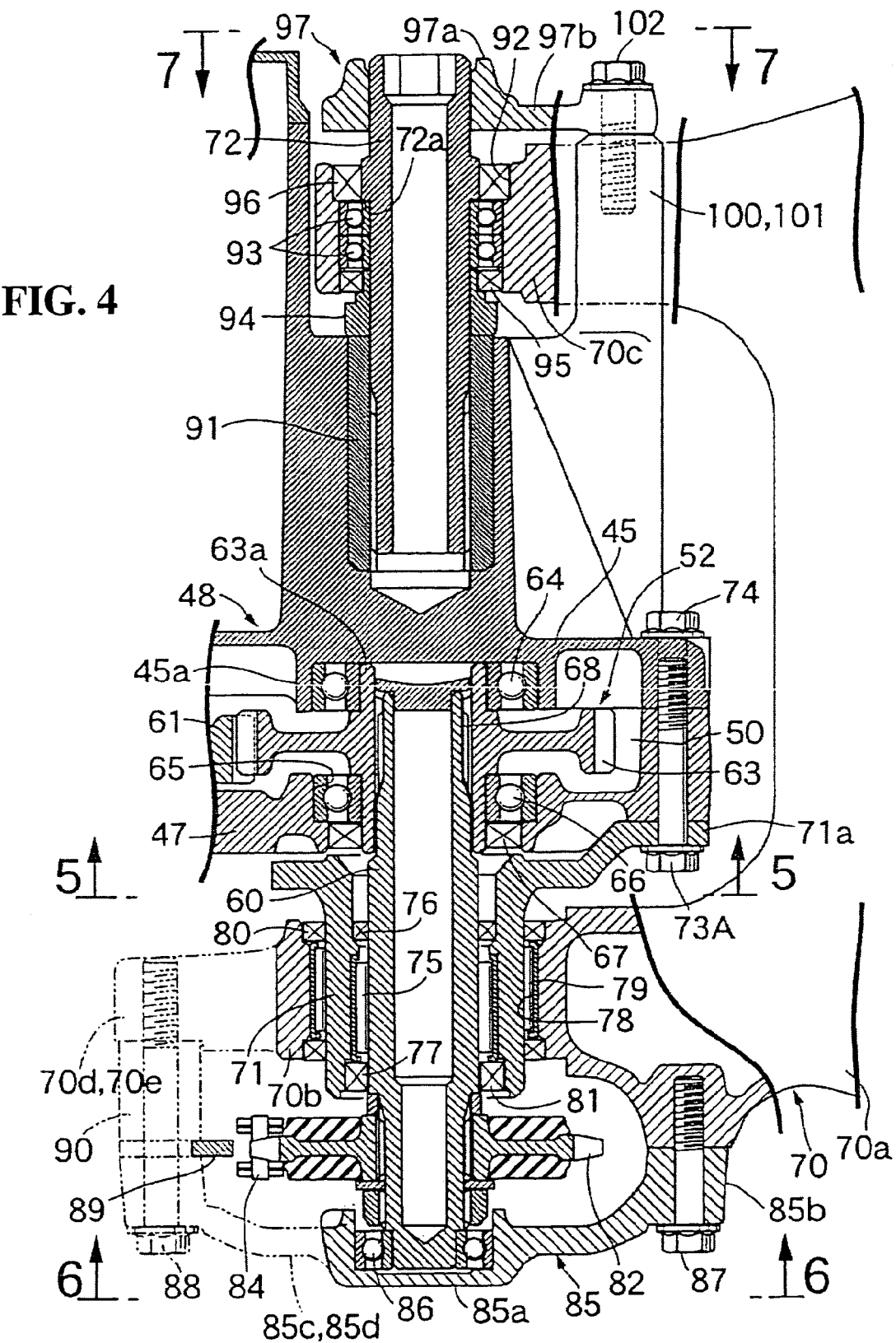
FIG. 4 is an enlarged view showing a portion indicated by arrow 4 of FIG. 3.

Referring to FIG. 4, the driven gear 63 serves as a final transmission member in the reduction transmission M and includes a cylindrical shaft portion 63a integrated at a center thereof. One end of the shaft portion 63a is rotatably supported by a bearing housing 45a via a ball bearing 64. The bearing housing 45a is integrated with a rear portion of the case main body 45 in the transmission case 48. In addition, a rear portion of the gear case 47 in the transmission case 48 includes a circular opening portion 65 formed to correspond to the bearing housing 45a. The other end of the shaft portion 63a is disposed coaxially in the opening portion 65. Moreover, a ball bearing 66 is inserted between an outer periphery of the shaft portion 63a and an inner periphery of the opening portion 65. Further, an annular sealing member 67 disposed outwardly of the ball bearing 66 is inserted between the outer periphery of the shaft portion 63a and the inner periphery of the opening portion 65.

The output shaft 60 is connected to the shaft portion 63a of the driven gear 63 through a spline 68. The output shaft 60 penetrates through a rear portion of the gear case 47 and partly projects to the left-hand side in the rear portion of the gear case 47. More specifically, the output shaft 60 is coaxially connected to the driven gear 63 by being removable in an axial direction and is incapable of relative rotation about the axis.

An axle 69 of the rear wheel WR is journaled by a rear portion of a swing arm 70. The swing arm 70 includes a swing arm main portion 70a and a pair of support arm portions 70b, 70c, each being integrated together with each other. The swing arm main portion 70a is formed in a substantially U-shape by being disposed on both sides and forward of the rear wheel WR. The pair of support arm portions 70b, 70c sandwiches mutually with each other in a zone between a rear portion of each of the case main body 45 and the gear case 47 forming part of the transmission case 48. The pair of support arm portions 70b, 70c is swingably supported by a rear portion of the power unit PA via a first pivot 71 and a second pivot 72 that is coaxial with the first pivot 71. The first and the second pivots 71, 72 are disposed coaxially with the output shaft 60.

Figure 5:
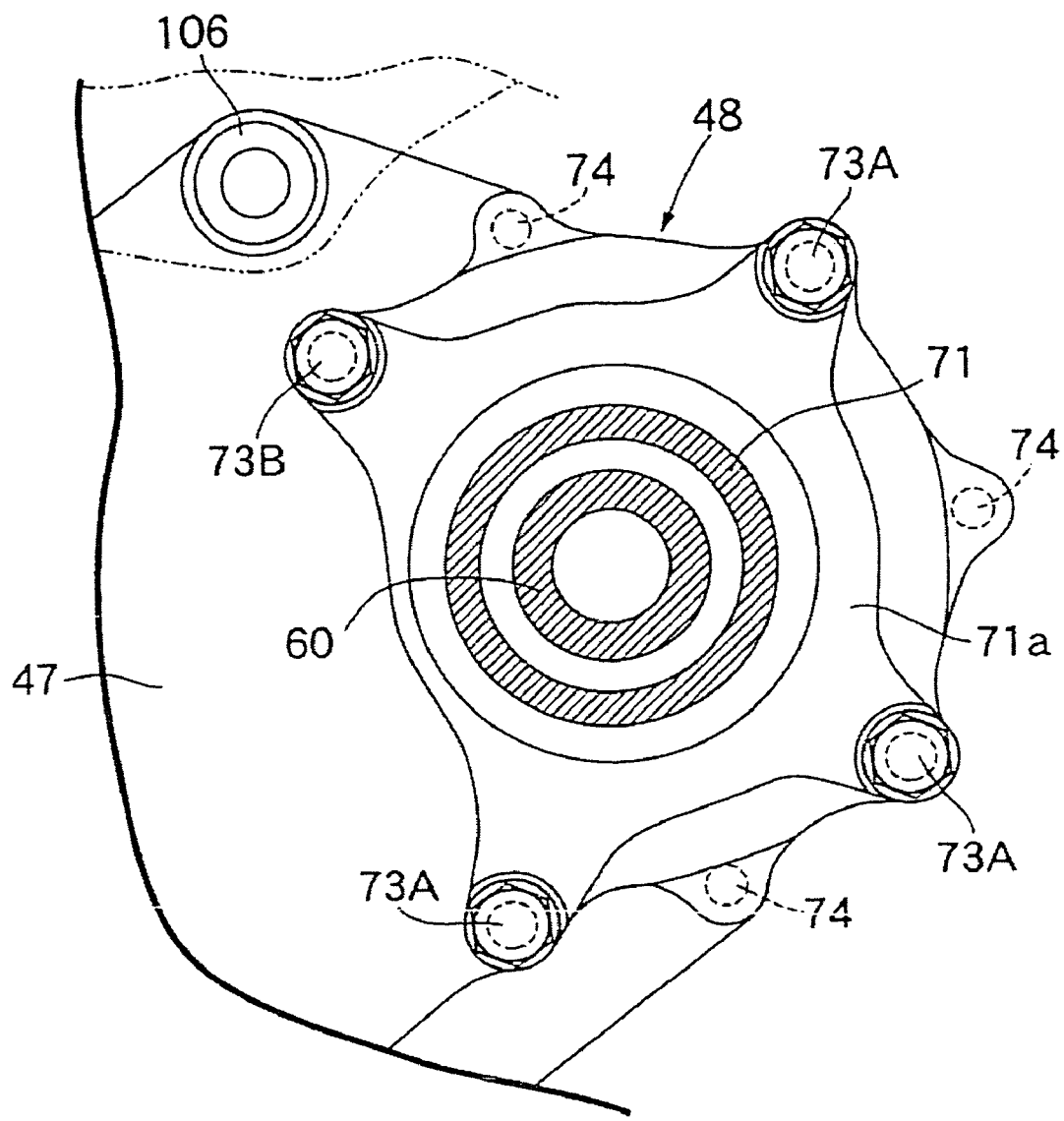
FIG. 5 is a cross-sectional view taken along line 5-5 of FIG. 4.

Referring to FIG. 5, the first pivot 71 is removably mounted on an outer surface in the rear portion of the gear case 47 in the transmission case 48. The first pivot 71 is formed into a cylinder so as to surround a projecting portion of the output shaft 60 coaxially projecting from the gear case 47. An end portion of the first pivot 71 adjacent to the gear case 47 includes a flange portion 71a integrally formed therewith to project sideways. The flange portion 71a is removably joined to the transmission case 48 through a plurality of, for example, four bolts 73A, 73A, 73A, 73B disposed with a space therebetween in a circumferential direction of the first pivot 71. The flange portion 71a is formed so as to be movable along a plane substantially orthogonal to an axis of the first pivot 71 in a mounting released condition, in which the bolts 73A . . . , 73B are loosened. In a condition, in which the output shaft 60 is disengaged and mounting of the power unit PA to the transmission case 48 is released, the first pivot 71 can be disengaged from the power unit PA by being moved in a direction substantially orthogonal to the axis.

A good part of the bolts 73A . . . , 73B, that is, the three bolts 73A . . . of the total of four according to the embodiment of the present invention are disposed on the outer peripheral portion of the transmission case 48 in a side view. A plurality of bolts 74, 74 . . . for joining the case main body 45 and the gear case 47, are mutually spaced apart from each other and are disposed on an outer peripheral portion of the transmission case 48. Each of the bolts 74, 74 . . . passed through the case main body 45 is screwed to the gear case 47. Accordingly, the bolts 73A . . . disposed on the outer peripheral portion of the transmission case 48 are disposed at positions substantially corresponding to the positions at which the plurality of bolts 74 . . . are disposed along the outer peripheral portion of the case main body 45 and the gear case 47 so as to join the case main body 45 and the gear case 47 with each other. Each of the bolts 73A . . . passed through the flange portion 71a and the gear case 47 are screwed in the case main body 45 in order, not only to secure the first pivot 71 to the transmission case 48, but also to join the case main body 45 with the gear case 47.

As described in the foregoing, a good part of the bolts 73A . . . , 73B used for securing the first pivot 71 to the transmission case 48, that is, the bolts 73A . . . are disposed on the outer peripheral portion of the transmission case 48 in the side view. The first pivot 71 can therefore be secured to a portion having a high rigidity of the transmission case 48. Accordingly, even if a load acts on the first pivot 71 while the motorcycle is being operated or in a similar situation, a part of the transmission case 48 on the side of the gear case 47 can be prevented from developing deformation. This can eliminate a condition, in which unnecessary distortion occurs in a shaft portion of each of the gears 61 to 63 in the gear case 47. Moreover, the bolts 73A . . . function also to fasten mutually the case main body 45 and the gear case 47. This helps reduce the number of bolts required for fastening the case main body 45 and the gear case 47 and mounting the first pivot 71 to the transmission case 48.

Figure 9:
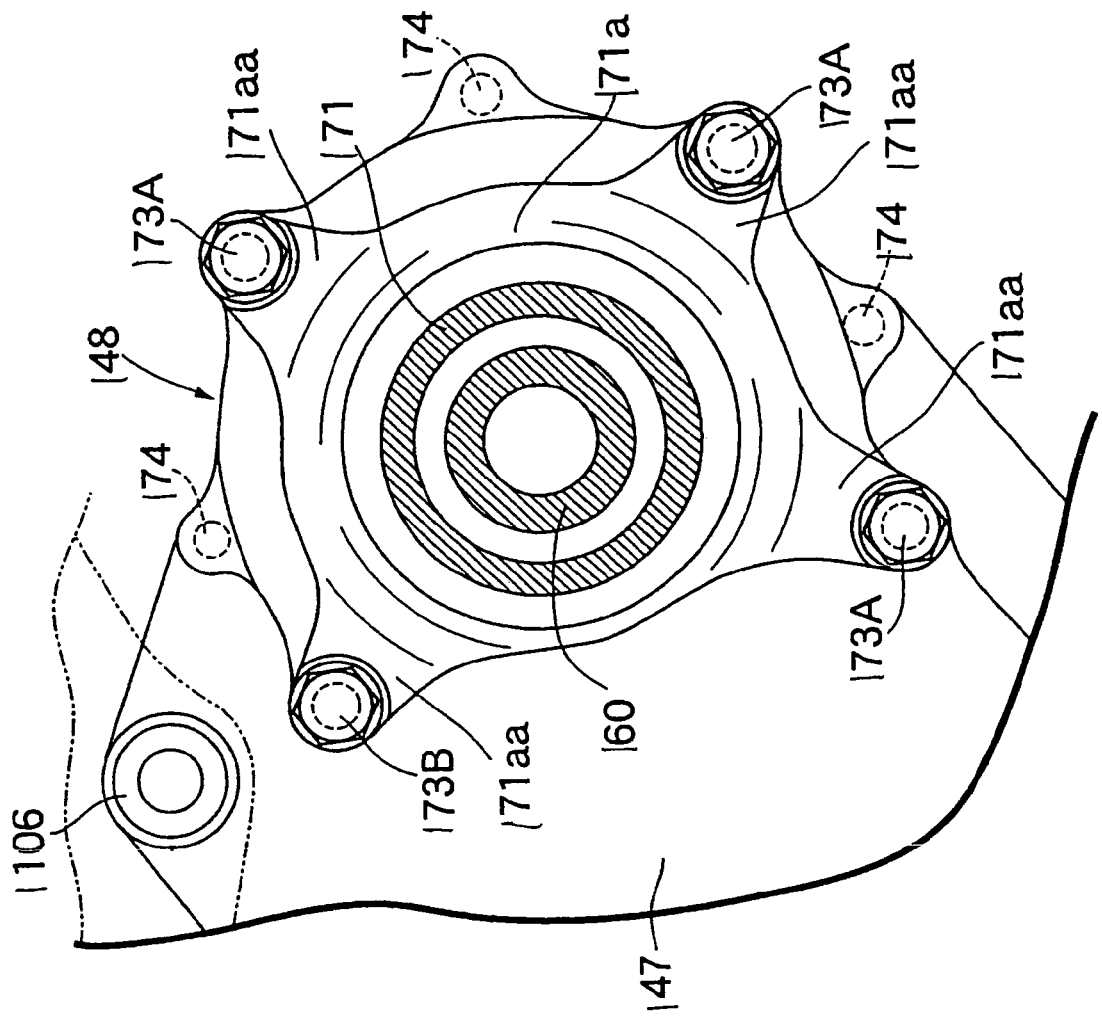
FIG. 9 is a cross-sectional view of another embodiment taken along line 5-5 in FIG. 4.

Referring to FIG. 9, the first shaft member 171 is removably mounted on an outer surface in the rear portion of the gear case 147 in the transmission case 148. The first shaft member 171 is formed into a cylinder so as to provide a projecting portion of the output shaft 160 that projects from the gear case 147 and passes coaxially therethrough and is journaled to the output shaft 160. The first shaft member 171 passes through, and swingably supports, the first support arm portion 170b. An end portion of the first shaft member 171 adjacent to the gear case 147 includes a flange portion 171a integrally formed therewith to project sideways.

The flange portion 171a is removably joined to the transmission case 148 through a plurality of, for example, four bolts 173A, 173A, 173A, 173B disposed with a space therebetween in a circumferential direction of the first shaft member 171. A bent portion 171aa bent toward the side of the transmission case 148 is formed on a leading end of each of the four circumferentially spaced bolting locations of the flange portion 171a. The bent portions 171aa . . . are bolted to the transmission case 48 using the bolts 173A . . . , 173B. In a mounting released condition, in which the bolts 173A . . . , 173B are loosened, the bent portions 171aa . . . abut on the gear case 147 of the transmission case 148 so as to run along a plane orthogonal to an axis of the first shaft member 171 in order to allow the bent portions 171aa . . . to move in a direction substantially orthogonal to the axis of the first shaft member 171. Accordingly, in the mounting released condition, in which the bolts 173A . . . , 173B are loosened, the flange portion 171a can move along the plane substantially orthogonal to the axis of the first shaft member 171. In a condition, in which the output shaft 160 is removed and mounting of the power unit PA to the transmission case 148 is released, the first shaft member 171 can be removed from the power unit PA by being moved in the direction substantially orthogonal to the axis.

The flange portion 171a is formed such that at least a part thereof extends up to an outer edge of the transmission case 148. Three of the bent portions 171aa . . . extend up to the outer edge of the transmission case 148. Those of the bent portions 171aa . . . that extend up the outer edge of the transmission case 148 are bolted to the transmission case 148 using the three bolts 173A . . . of the bolts 173A . . . , 173B.

A plurality of bolts 174, 174, mutually spaced apart from each other, is disposed on an outer peripheral portion of the transmission case 148 so as to join the case main body 145 and the gear case 147. Each of the bolts 174, 174 . . . passed through the case main body 145 is screwed to the gear case 147. Accordingly, the bolts 173A . . . disposed on the outer edge of the transmission case 148 are disposed at positions substantially corresponding to the positions at which the plurality of bolts 174 . . . are disposed along the outer peripheral portion of the case main body 145 and the gear case 147 so as to join the case main body 145 and the gear case 147 with each other, the case main body 145 and the gear case 147 constituting at least part of the transmission case 148. Each of the bolts 173A . . . passed through the flange portion 171a and the gear case 147 are screwed in the case main body 145 in order, not only to secure the first shaft member 171 to the transmission case 148, but also to join the case main body 145 with the gear case 147.

A needle bearing 75, and annular sealing members 76, 77 disposed on an inside and outside of the needle bearing 75, are inserted between the output shaft 60 that passes through the first pivot 71 and the first pivot 71.

The support arm portion 70b in the swing arm 70 includes a support hole 78, through which the output shaft 60 and the first pivot 71 are passed. A needle bearing 79, and annular sealing members 80, 81 disposed on an inside and outside of the needle bearing 79, are inserted between an outer periphery of the first pivot 71 and an inner periphery of the support hole 78. The arrangement, in which the first pivot 71 passes through the support arm portion 70b of the swing arm 70, helps stabilize the swing motion support of the swing arm 70. The arrangement can also provide a positive support for the output shaft 60.

An outer end portion of the output shaft 60 projects outwardly from the support arm portion 70b in the swing arm 70. A drive sprocket 82 is secured to this portion of the output shaft 60 projecting from the swing arm 70. A driven sprocket 83 is, on the other hand, secured to the axle 69 of the rear wheel WR on the left-hand side in the direction of travel of the motorcycle as shown in FIG. 1. An endless chain 84 is wound around the drive sprocket 82 and the driven sprocket 83.

Figure 6:
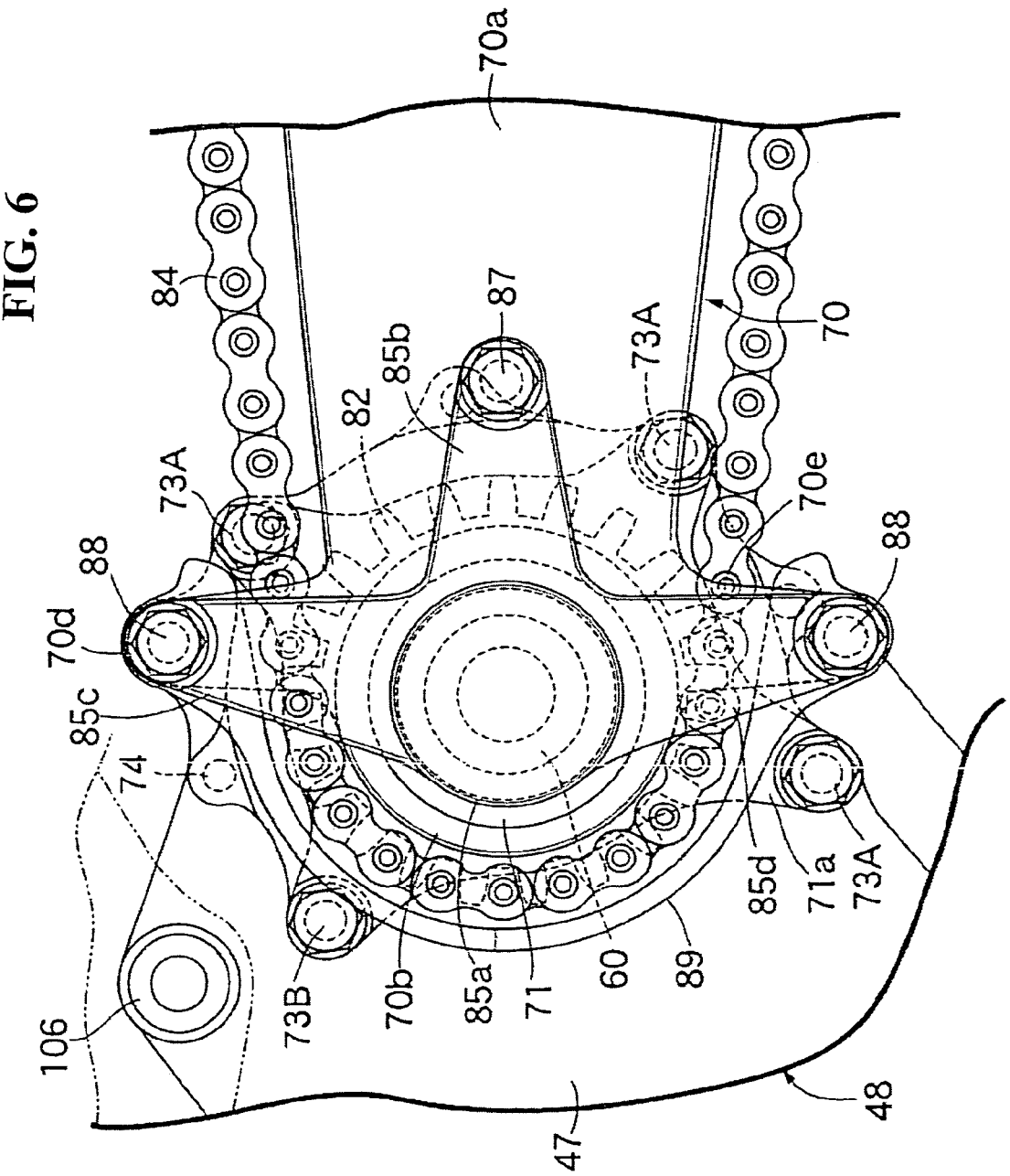
FIG. 6 is a view taken along arrow 6-6 of FIG. 4.

Referring to FIG. 6, an output shaft holder 85 for covering the outer end portion of the output shaft 60 is mounted on the side of a front end outer surface of the support arm portion 70b in the swing arm 70. The output shaft holder 85 includes, as integral parts thereof, a bearing housing portion 85a and mounting arm portions 85b, 85c, 85d. The bearing housing portion 85a is formed into a circular plate so as to cover the outer end of the output shaft 60. The mounting arm portions 85b, 85c, 85d are formed so as to extend outwardly from three places spaced apart from each other circumferentially of the bearing housing portion 85a. The outer end portion of the output shaft 60 is rotatably supported by the bearing housing portion 85a via a ball bearing 86.

A drive sprocket 82 is secured to this portion of the output shaft 60 projecting from the swing arm 70. The drive sprocket 82 is a driving force transmission wheel for transmitting the driving force from the output shaft 60 to the rear wheel WR. A driven sprocket 83 is, on the other hand, secured to the axle 69 of the rear wheel WR on the left-hand side in the direction of travel of the motorcycle as shown in FIG. 1. An endless chain 84 is wound around the drive sprocket 82 and the driven sprocket 83.

Of the mounting arm portions 85b, 85c, 85d, the mounting arm portion 85b extends rearwardly from the bearing housing portion 85a. A leading end portion of the mounting arm portion 85b is removably fastened to the left side surface of the swing arm 70. The remaining mounting arm portions 85c, 85d extend upwardly and downwardly, respectively, from the bearing housing portion 85a. Leading end portions of the mounting arm portions 85c, 85d are removably fastened to support plate portions 70d, 70e by means of bolts 88, 88.

Referring to FIG. 6, the plurality of bolts 73A . . . , 73B for fastening the flange portion 71a of the first shaft member 71 to the transmission case 48 is disposed outwardly from an outer periphery of the drive sprocket 82 on a projection drawing onto a plane orthogonal to the axis of the output shaft 60 (the plane that runs in parallel with a paper surface of FIG. 6).

An output shaft holder 85 for covering the outer end portion of the output shaft 60 is mounted on the side of a front end outer surface of the first support arm portion 70b in the swing arm 70. The output shaft holder 85 includes, as integral parts thereof, a bearing housing portion 85a and mounting arm portions 85b, 85c, 85d. The bearing housing portion 85a is formed into a circular plate so as to cover the outer end of the output shaft 60. The mounting arm portions 85b, 85c, 85d are formed so as to extend outwardly from three places spaced apart from each other circumferentially of the bearing housing portion 85a. The outer end portion of the output shaft 60 is rotatably supported by the bearing housing portion 85a via a ball bearing 86.

The support plate portions 70d, 70e are disposed integrally with an upper portion and a lower portion, respectively, of the first support arm portion 70b in the swing arm 70. Bolts 87, 88, 88 for attaching the mounting arm portions 85b, 85c, 85d to the swing arm 70 are disposed at positions not overlapping with the bolts 73A . . . , 73B for mounting the first shaft member 71 to the transmission case 48 on a projection drawing onto a plane orthogonal to the axis of the output shaft 60 (the plane that runs in parallel with a paper surface of FIG. 6). These arrangements achieve an even greater support rigidity of the first support arm portion 70b through mutually complementary functions of the first shaft member 71 and the output shaft holder 85.

A front half portion of the drive sprocket 82 secured to the output shaft 60 is arranged to be exposed forwardly from the bearing housing portion 85a of the output shaft holder 85. A protective plate 89 that is formed into a semicircle so as to cover the front half portion of the drive sprocket 82 from a forward direction is disposed forward of the drive sprocket 82.

One end of the cylindrical spacers 90 . . . (see FIG. 4) abut on the support plate portions 70d, 70e. The protective plate 89 is clamped between the other ends of the spacers 90 . . . and the mounting arm portions 85c, 85d. Moreover, the bolts 88 . . . passed through the mounting arm portions 85c, 85d, the protective plate 89, and the spacers 90 . . . are screwed in the support plate portions 70d, 70e.

The second shaft member 72 passes through the second support arm portion 70c in the swing arm 70 and is removably secured to the power unit PA. According to the first embodiment of the present invention, the second shaft member 72 is a bolt that is screwed in a cylindrical body 91 insert to be connected to the case main body 45 in the transmission case 48 of the power unit PA.

The second support arm portion 70c of the swing arm 70 includes a support hole 92, through which the second shaft member 72 is passed. A pair of ball bearings 93, 93 is inserted between an outer periphery of the second shaft member 72 and an inner periphery of the support hole 92. An inner race of each of the ball bearings 93 . . . is clamped between an annular shouldered portion 72a and one end of a cylindrical spacer 94. The shouldered portion 72a is disposed on an outer periphery of the second shaft member 72. The spacer 94 is disposed so as to coaxially surround the second shaft member 72 with the other end thereof abutting against an outer end of the cylindrical body 91. In addition, an annular sealing member 95 is inserted between an outer periphery of the spacer 94 and an inner periphery of the support hole 92 on an inward side of the ball bearings 93. An annular sealing member 96 is inserted between an outer periphery of the second shaft member 72 and the inner periphery of the support hole 92 on an outward side of the ball bearings 93 . . . .

Figure 7:
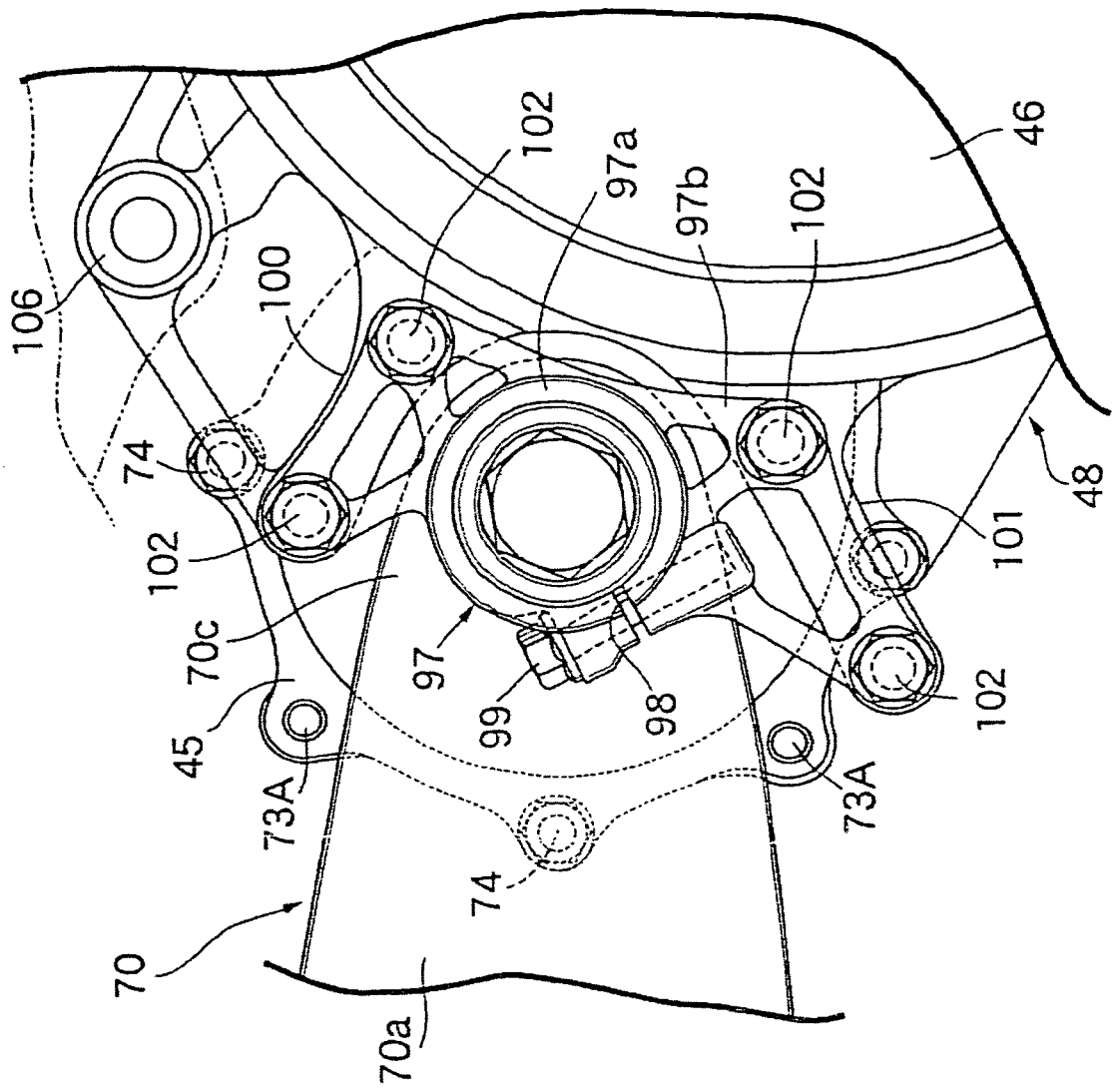
FIG. 7 is a view taken along arrow 7-7 of FIG. 4.

Referring to FIG. 7, an outer end portion of the second pivot 72 is fixedly held by a pivot holder 97 that is removably mounted on the case main body 45 of the transmission case 48. The pivot holder 97 integrates a holding portion 97a with a mounting portion 97b. The holding portion 97a is substantially circularly formed with a slit 98 at one circumferential place therein. The mounting portion 97b juts out sideways from the holding portion 97a. A bolt 99, which traverses the slit 98, is screwed in the holding portion 97a. Accordingly, the outer end portion of the second pivot 72 is fixedly held in position by the holding portion 97a when the bolt 99 in a condition of passing through the outer end portion of the second pivot 72 is tightened on the holding portion 97a.

A plurality of, for example, two boss portions 100, 101 are integrally provided in a projecting condition on the case main body 45 in the transmission case 48 of the power unit PA at a portion outside the swing motion range of the swing arm 70. The boss portions 100, 101 are provided so as to abut against the mounting portion 97b of the pivot holder 97. The mounting portion 97b is removably secured to the boss portions 100, 101 using two bolts 102, 102 each.

A pair of brackets 106 . . . that extend upwardly is disposed in the rear of the transmission case 48. These brackets 106 . . . are supported by a rear end portion of the main pipes 20. As clearly indicated in FIG. 1, a pair of main stand shafts 107 . . . is coaxially disposed on a lower portion rearwardly of the transmission case 48. A main stand 108 is rotatably journaled about the pair of main stand shafts 107 . . . . In addition, a cross pipe 109 is disposed between the curved portions 20c . . . of the main pipes 20 . . . . A rear shock absorber 110 having an axis extending in a fore-aft direction is disposed between the cross pipe 109 and a shock absorber bracket 111 is disposed at a front portion of the swing arm 70.

Figure 10:
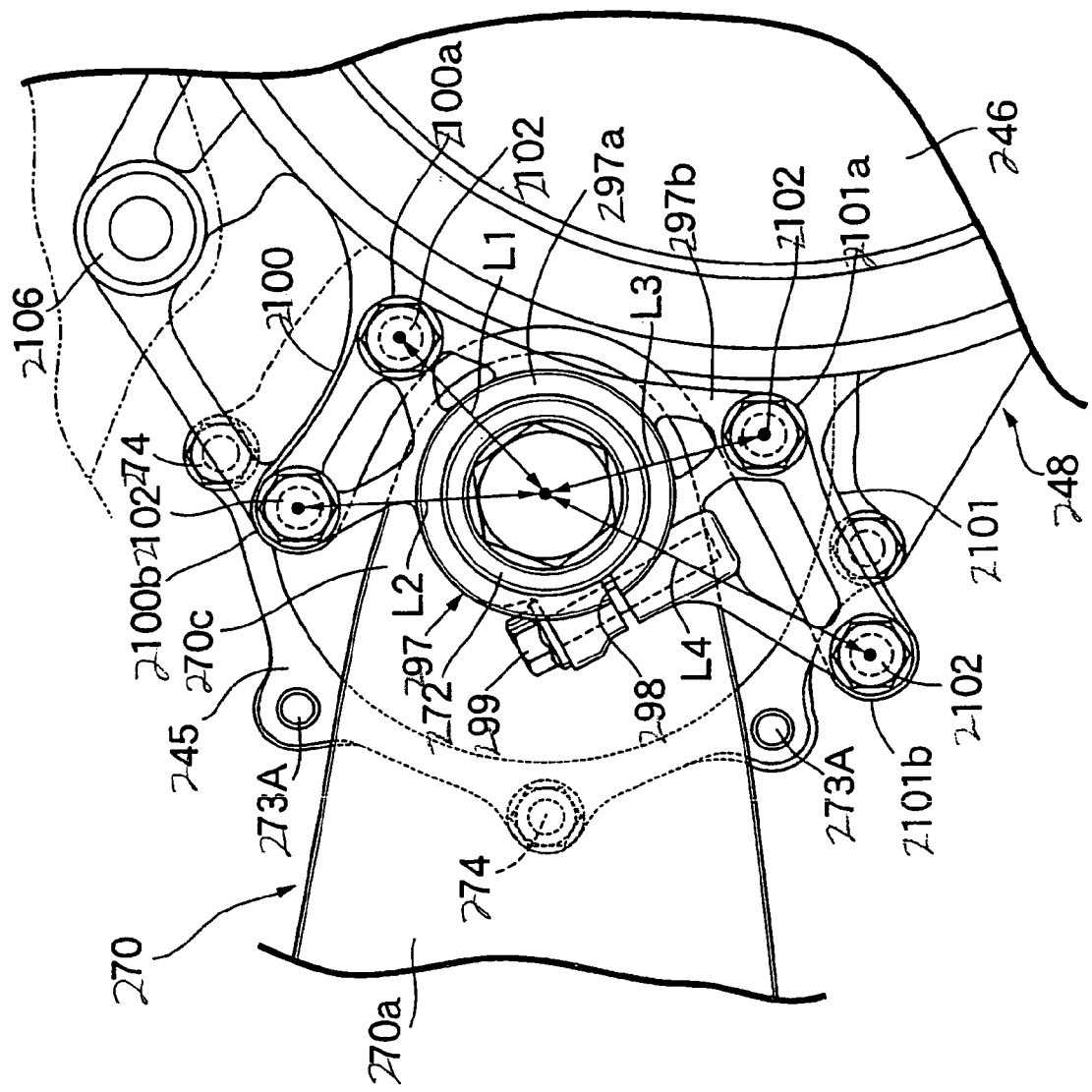
FIG. 10 is a cross-sectional view of another embodiment taken along line 7-7 in FIG. 4.

Referring to FIG. 10, an outer end portion of the second shaft member 272 is fixedly held by a shaft holding member 297 that is removably mounted on the case main body 245 of the transmission case 248 in the power unit PA. The shaft holding member 297 is a casting or other type of molding that integrates a holding portion 297a with a mounting portion 297b. The holding portion 297a is substantially circularly formed having a slit 98 at one circumferential place therein. The mounting portion 297b juts out sideways from the holding portion 297a. A bolt 299, which traverses the slit 298, is screwed in the holding portion 297a. Accordingly, the outer end portion of the second shaft member 272 is fixedly held in position by the holding portion 297a when the bolt 299 in a condition of passing through the outer end portion of the second shaft member 272 is tightened on the holding portion 297a.

The case main body 245 in the transmission case 248 of the power unit PA includes a plurality of, for example, two boss portions 2100, 2101 provided, for example, integrally therewith in a projecting condition so as to sandwich the second support arm portion 270c from above and below. The boss portions 2100, 2101 project outwardly from the second support arm portion 270c, while overlapping with the second support arm portion 270c in the swing arm 270 in their top view. Further, the boss portions 2100, 2101 are disposed at positions that fall outside a range of swing motion of the second support arm portion 270c in the swing arm 270.

At least one of the two boss portions 2100, 2101, or both boss portions 2100, 2101 according to the embodiment of the present invention include a plurality of, for example, a pair of fastening seats 2100a, 2100b, 2101a, 2101b provided on leading ends thereof. The fastening seats 2100a, 2100b, 2101a, 2101b abut against the mounting portion 297b of the shaft holding member 297. The mounting portion 297b of the shaft holding member 297 is removably secured to the fastening seats 2100a, 2100b, 2101a, 2101b using bolts 2102, 2102 . . . .

Positions of the fastening seats 2100a, 2100b in the boss portion 2100 are established such that a center-to-center distance L1 between the forwardly positioned fastening seat 2100a, of the two fastening seats 2100a, 2100b, and the second shaft member 272 is greater than a center-to-center distance L2 between the rearwardly positioned fastening seat 2100b and the second shaft member 272. Positions of the fastening seats 2101a, 2101b in the boss portion 2101 are established such that a center-to-center distance L3 between the forwardly positioned fastening seat 2101a, of the two fastening seats 2101a, 2101b, and the second shaft member 272 is greater than a center-to-center distance L4 between the rearwardly positioned fastening seat 2101b and the second shaft member 272. More specifically, the pair of boss portions 2100, 2101 sandwiching the second support arm portion 270c of the swing arm 270 includes the pair of fastening seats 2100a, 2100b, 2101a, 2101b for fastening the shaft holding member 297. In each of the boss portions 2100, 2101, the position of each of the fastening seats 2100a, 2100b, 2101a, 2101b is established so that the distance from the center of the second shaft member 272 to each of the fastening seats 2100a, 2100b, 2101a, 2101b is smaller with the forwardly positioned fastening seats 2100a, 2101a.

A pair of brackets 2106 . . . extending upwardly is disposed in the rear of the transmission case 248. These brackets 2106 . . . are supported by a rear end portion of the main pipes 220 . . . .

As clearly indicated in FIG. 1, a pair of main stand shafts 107 . . . is coaxially disposed on a lower portion rearward of the transmission case. A main stand 108 is rotatably journaled about the pair of main stand shafts 107 . . . . In addition, a cross pipe 109 is disposed between the curved portions 20c . . . of the main pipes 20 . . . . A rear shock absorber 110 having an axis extending in a fore-aft direction is disposed between the cross pipe 109 and a shock absorber bracket 111 disposed at a front portion of the swing arm 70.

Referring specifically to FIG. 2, a downstream end of an intake pipe 112 extending forwardly from the cylinder head 30 is connected to a forward side surface of the cylinder head 30. A fuel injection valve 113 is mounted on the cylinder head 30 at a point near the connection of the intake pipe 112. An upstream end of the intake pipe 112 is connected to an air cleaner 115 via a throttle body 114.

A radiator 116 is disposed at a front portion downward of the air cleaner 115 such that the radiator 116 is located forward of the engine EA. The radiator 116 cools an engine coolant heated by the water-cooled engine EA. Mounting arm portions 117 . . . project toward the side of the engine hanger brackets 19a . . . of the vehicle body frame F and are disposed on lower portions of the radiator 116. The mounting arm portions 117 . . . are supported via mounting rubbers 119 . . . by brackets 118 . . . disposed on the engine hanger brackets 19a. . . . Further, mounting arm portions 120 project toward the side of the lower pipes 19 . . . located upwardly of the radiator 116 and are disposed on an upper portion of the radiator 116. The mounting arm portions 120 . . . are supported via a mounting rubber (not shown) by brackets 121 . . . disposed on the lower pipes 19 . . . . That is, the radiator 116 is supported by the lower pipes 19 . . . and the engine hanger brackets 19a . . . of the vehicle body frame F.

An upstream end of an exhaust pipe 122 is connected to a rear side surface of the cylinder head 30 in the engine EA. A downstream end of the exhaust pipe 122 is connected to an exhaust muffler 123 disposed on the right of the rear wheel WR.

Referring specifically to FIG. 1, the vehicle body frame F and the power unit PA are covered with a vehicle body cover 125 made of a synthetic resin. The vehicle body cover 125 includes a front cover 126, a center cover 127, a pair of right and left leg shields 128 . . . , a floor tunnel portion 129, and a rear cover 130. The front cover 126 covers a front portion of the head pipe 17 and an upper portion of the front wheel WF. The center cover 127 continues to the front cover 126 by covering the head pipe 17 from the rear side. The leg shields 128 . . . for covering a forward portion of a leg portion of a rider are joined to corresponding sides of the front cover 126. The floor tunnel portion 129 continues to the leg shields 128 . . . and the center cover 127. The rear cover 130 covers both right and left sides of a rear portion of the vehicle body frame F.

A storage box 134 is disposed downwardly of a rider's seat 131. The storage box 134 has an upper end opening portion that can be opened or closed by a bottom plate 132 of the rider's seat 131. The storage box 134 is supported by the main pipes 20 . . . and the seat rails 23 . . . .

The storage box 134 is disposed upwardly of the rear shock absorber 110 that is disposed between the cross pipe 109 of the vehicle body frame F and the swing arm 70 and extends in the fore-aft direction. A bottom portion of the storage box 134 has a substantially U-shaped cross section that is open downwardly so as to straddle across the rear shock absorber 110 from above.

A fuel tank 135 is disposed rearwardly of the storage box 134. The fuel tank 135 allows fuel to be filled therein by opening the rider's seat 131. The fuel tank 135 is elastically supported by rear portions of the rear pipes 24 . . . .

The operation of the first embodiment of the present invention will be described below. The output shaft 60 included in the power unit PA is connected to the driven gear 63 as the final transmission member of the reduction transmission M by being removable in the axial direction and is incapable of relative rotation about the axis. The output shaft 60 is also disposed such that the outer end portion thereof projects outwardly of the swing arm 70. The first and second support arm portions 70b, 70c are disposed on the right and left at the front of the front portion of the swing arm 70 and are, on the other hand, swingably supported by the transmission case 48 in the power unit PA via the cylindrical first shaft member 71 that has the output shaft 60 coaxially passed therethrough and the second shaft member 72 which is coaxial with the first shaft member 71. The first shaft member 71 is removably mounted to the transmission case 48 by being releasable from the transmission case 48 of the power unit PA by being moved along a plane substantially orthogonal to its axis in a mounting released condition. The second shaft member 72 is removably secured to the transmission case 48 by being releasable in the axial direction from the transmission case 48 of the power unit PA in a fixing released condition.

According to this swing motion support structure for the swing arm 70 on the power unit PA, the swing arm 70 is removed from the power unit PA as follows. More specifically, the release of the output shaft 60 from the power unit PA, the release of the fixing of the first shaft member 71 relative to the power unit PA, and the release of the second shaft member 72 from the power unit PA are performed with the output shaft holder 85 removed from the swing arm 70. Then, the swing arm 70 is removed from the power unit PA. To reassemble the swing arm 70 to the power unit PA, the foregoing removal steps should be reversed. Accordingly, removal and reassembly steps performed for the swing arm 70 relative to the power unit PA can be facilitated. The structure also eliminates the need for dividing the swing arm 70, which reduces the number of parts used. Further, the second shaft member 72 is removably secured to the power unit PA by being releasable in the axis direction from the power unit PA in the fixing released condition. This arrangement allows the second shaft member 72 to be released from the power unit PA to prevent the second shaft member 72 from interfering with the removal or reinstallation steps performed for the swing arm 70 relative to the power unit PA. This enhances the workability of the removal and reinstallation procedures.

Moreover, a one-piece molding of the swing arm 70 helps reduce the number of parts used and enhances the assembly accuracy of the swing arm 70 relative to the power unit PA. The arrangement also eliminates the need for a fastening structure for assembling the swing arm 70 by joining a plurality of members with bolts or the like. This contributes to a more enhanced rigidity of the swing arm 70 itself and a reduced weight of unsprung weight.

In addition, the swing arm 70 is swingably supported by the power unit PA mounted in the vehicle body frame F so as to drive the rear wheel WR. This eliminates the need for disposing the vehicle body frame F at a point near the swing motion support portion of the swing arm 70. A stabilized swing motion can be achieved for the swing arm 70 by making use of the rigidity of the power unit PA.

The output shaft holder 85 is removably mounted on the front portion of the swing arm 70 so as to cover, and rotatably support, the outer end portion of the output shaft 60. The output shaft holder 85 therefore functions also as a support member and a cover member for the output shaft 60. This not only enhances the appearance quality, but also provides an even more positive support for the output shaft 60.

Further, the outer end portion of the second pivot 72 that passes through the swing arm 70 and is screwed to the transmission case 48 in the power unit PA is fixedly held by the pivot holder 97 that is removably mounted to the plurality of boss portions 100, 101 provided on the transmission case 48 of the power unit PA at the portion outside the swing motion range of the swing arm 70. A dual support structure of the second pivot 72 to the power unit PA can be realized and the number of parts used for preventing the second pivot 72 screwed in the power unit PA from coming loose can be minimized. This not only enhances the supporting rigidity of the second pivot 72 on the power unit PA, but also stabilizes even further the swing motion support for the swing arm 70.

The first shaft member 71 passes through the first support arm portion 70b and is formed into a cylindrical shape so as to swingably support the first support arm portion 70b. The flange portion 71a, which juts out sideways from the end portion of the first shaft member 71 adjacent to the transmission case 48 so that at least part thereof extends up to an outer edge of the transmission case 48 included in the power unit PA, is removably mounted on the transmission case 48. The outer end of the output shaft 60 that passes through, and is journaled by, the first shaft member 71 projects outwardly of the first support arm portion 70b. The drive sprocket 82 is then secured to the outer end portion of the output shaft 60 outwardly of the first support arm portion 70b. It is therefore easy to obtain a support rigidity of the swing arm 70 by the first shaft member 71, which makes it easier to achieve a required strength of the support portion. Further, the first shaft member 71 includes the flange portion 71a that includes a portion extending up to the outer edge of the transmission case 48 of the power unit PA having a relatively high rigidity, and the flange portion 71a is mounted on the transmission case 48. Accordingly, the rigidity can be obtained even more easily.

The case main body 45 and the gear case 47 that are the plurality of case members constituting at least part of the transmission case 48 are fastened with the bolts 73A . . . that form at least part of the plurality of bolts 73A . . . , 73B used for attaching the flange portion 71a to the transmission case 48. Accordingly, mounting rigidity of the first shaft member 71 can be enhanced by fastening part of the flange portion 71a to a portion whose rigidity is relatively enhanced in order to join the case main body 45 and the gear case 47. The arrangement also helps reduce the number of bolts required for fastening the case main body 45 and the gear case 47 and mounting the first shaft member 71 to the transmission case 48.

A good part of the bolts 73A . . . , 73B used for securing the first shaft member 71 to the transmission case 48, that is, the bolts 73A . . . are disposed on the outer peripheral portion of the transmission case 48 in a side view. The first shaft member 71 can therefore be secured to a portion having a high rigidity of the transmission case 48. Accordingly, even if a load acts on the first shaft member 71 while the motorcycle is running or in a similar situation, a part of the transmission case 48 on the side of the gear case 47 can be prevented from developing deformation. This can eliminate a condition, in which unnecessary distortion occurs in a shaft portion of each of the gears 61 to 63 in the gear case 47.

The bent portions 71aa . . . bent toward the side of the transmission case 48 are formed on a portion of the flange portion 71a extending up to the outer edge of the transmission case 48. These bent portions 71aa . . . are bolted to the transmission case 48 using the bolts 73A. . . . This allows head portions of the bolts 73A . . . to be disposed even more inwardly. As a result, an increase in vehicle body dimensions, such as vehicle width or the like, can be suppressed, while avoiding, for example, interference with the swing arm 70.

The plurality of bolts 73A . . . , 73B for fastening the flange portion 71a to the transmission case 48 is disposed outwardly from the outer periphery of the drive sprocket 82 on the projection drawing onto the plane orthogonal to the axis of the output shaft 60. Even when a large load acts on the first shaft member 71 from the output shaft 60, therefore, the first shaft member 71 can be firmly secured to the transmission case 48 of the power unit PA. As a result, the rigidity of the swing motion support portion of the swing arm 70 by the first shaft member 71 can be even further enhanced.

The output shaft holder 85 is removably mounted on the front portion of the swing arm 70 so as to cover, and rotatably support, the outer end portion of the output shaft 60. The output shaft holder 85 therefore functions also as a support member and a cover member for the output shaft 60. This not only enhances the appearance quality, but also provides an even more positive support for the output shaft 60.

The outer end portion of the second shaft member 72 that passes through the swing arm 70 and is screwed to the transmission case 48 in the power unit PA is fixedly held by the shaft holding member 97 that is removably mounted to the plurality of boss portions 100, 101 provided on the transmission case 48 of the power unit PA. A dual support structure of the second shaft member 72 to the power unit PA can be realized for the enhanced rigidity of the second shaft member 72 using a simple structure of supporting the second shaft member 72 with the power unit PA and the shaft holding member 97. Swing support of the swing arm 70 can thereby be even further stabilized. It is also possible to adjust the rigidity of the shaft holding member 97, thus allowing the rigidity of the second shaft member 72 to be adjusted to a precise value established in accordance with the applicable vehicle model. Moreover, the number of parts used for preventing the second shaft member 72 screwed in the power unit PA from coming loose can be minimized. This simplified structure keeps relatively small the increase in weight and cost and allows the power unit PA to be disposed on the inside of the swing arm 70. The degree of freedom in vehicle body layout can thus be increased.

The shaft holding member 97 includes the holding portion 97a that is substantially circularly formed so as to let the outer end portion of the second shaft member 72 pass therethrough and includes the slit 98 at one circumferential place therein. The second shaft member 72 is held in position by the shaft holding member 97 by tightening the bolt 99 that traverses the slit 98 and is screwed in the holding portion 97a. Accordingly, the outer end of the second shaft member 72 can be positively held in position with the shaft holding member 97 of a simple structure for the enhanced rigidity of the second shaft member 72. Moreover, it is easy to perform the operations of holding and releasing the hold of the second shaft member 72.

The transmission case 48 of the power unit PA includes a plurality of, for example, a pair of boss portions 100, 101 for removably mounting the shaft holding member 97. Of the boss portions 100, 101, the boss portions 100, 101 that overlap with the swing arm 70 in a top view thereof are disposed at positions that fall outside the range of swing motion of the swing arm 70. This ensures a swing motion stroke for the swing arm 70 and allows the second shaft member 72 to be positively secured in position. It is also possible to build the shaft holding member 97 compactly. All of the above contribute to a reduced cost.

At least part of the boss portions 100, 101, or both of the boss portions 100, 101 according to the first embodiment of the present invention are provided in the transmission case 48 of the power unit PA so as to project outwardly from the swing arm 70. This allows the shaft holding member 97 to be configured compactly, while keeping projections and indentations thereof minimal. Accordingly, the shaft holding member 97 may also be manufactured through, for example, press forming, though the shaft holding member 97 according to the first embodiment of the present invention is a casting or other type of molding.

In addition, at least one of the pair of boss portions 100, 101 disposed in the transmission case 48 of the power unit PA at positions sandwiching the support arm portion 70c of the swing arm 70, or both boss portions 100, 101 according to the embodiment of the present invention include a plurality of fastening seats 100a, 100b, 101a, 101b for fastening the shaft holding member 97. In each of the boss portions 100, 101, the position of each of the fastening seats 100a, 100b, 101a, 101b is established so that the distance from the center of the second shaft member 72 to each of the fastening seats 100a, 100b, 101a, 101b is smaller with the forwardly positioned fastening seats 100a, 101a. This enables positive fixing of the shaft holding member 97 to the boss portions 100, 101. Thus, the shaft holding member 97 can be efficiently and compactly disposed, while securing a clearance from the swing arm 70.

Figure 8:
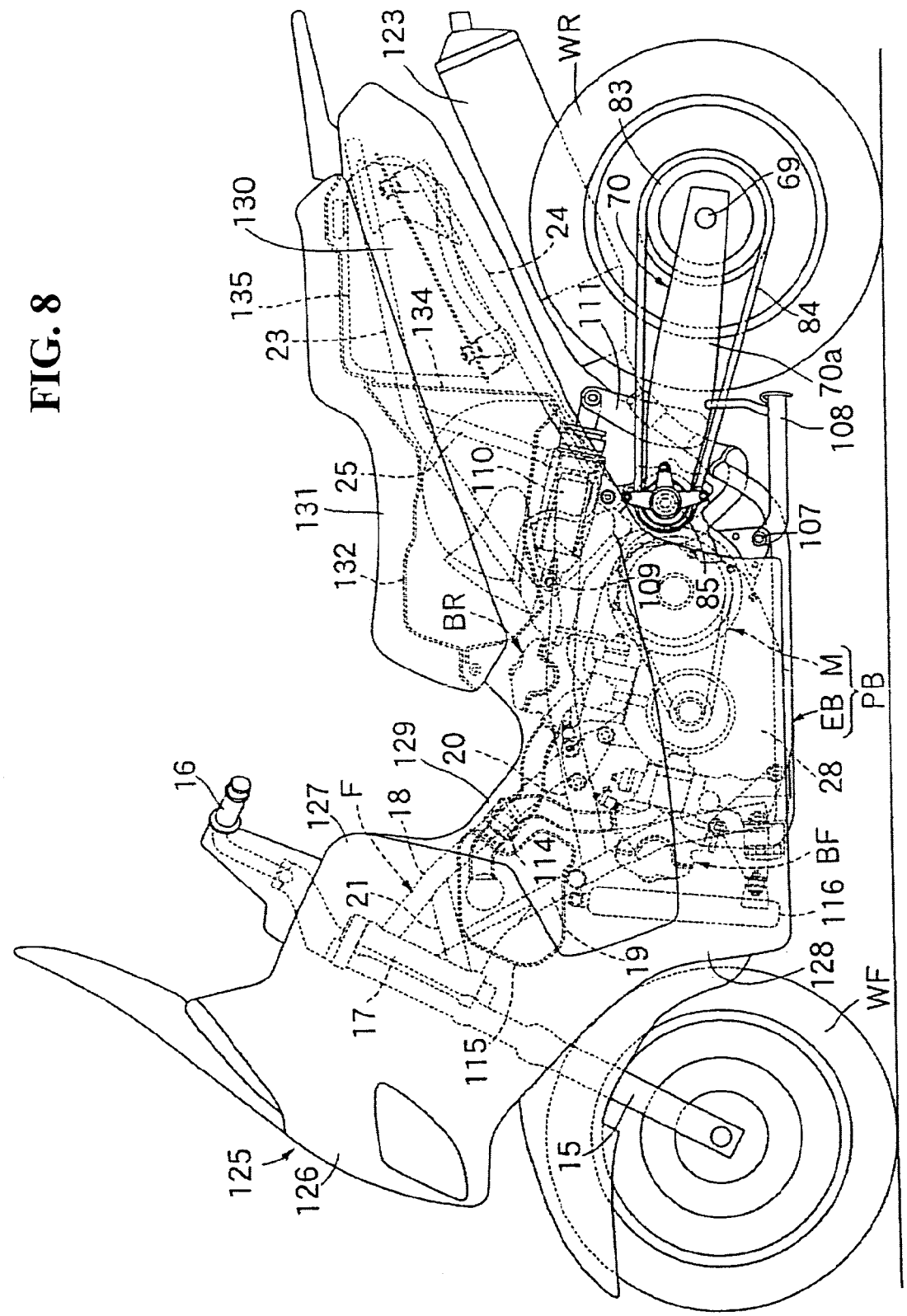
FIG. 8 is a side elevational view showing a motorcycle according to a second embodiment of the present invention.

FIG. 8 is a side elevational view showing a motorcycle according to a second embodiment of the present invention. Like parts are identified by the same reference numerals as in the first embodiment of the present invention.

A vehicle body frame F of a scooter type motorcycle includes a power unit PB mounted thereon for driving a rear wheel WR. The power unit PB includes a four-cycle engine EB and a reduction transmission M for transmitting an output from the engine EB to the rear wheel WR through the required speed reduction. The engine EB may, for example, be formed as a water-cooled two-cylinder V configuration. The engine EB includes a rear portion bank BR and a front portion bank BF. The rear portion bank BR rises upwardly from a crankcase 28. The front portion bank BF has a cylinder axis that is inclined forwardly and slightly upwardly so as to form the letter V with the rear portion bank BR.

The power unit PB swingably supports a front portion of a swing arm 70, a rear portion of which journals the rear wheel WR, using the same support structure as the first embodiment of the present invention.

The same effects as those derived from the first embodiment of the present invention can be achieved by the second embodiment of the present invention.

While the present invention has been described in connection with the preferred embodiments thereof, it will be understood that it is not intended to limit the invention to those embodiments. On the contrary, it is intended to cover all alternatives, modifications, and equivalents as may be included within the spirit and scope of the invention as defined by the appended claims.

For example, in the foregoing embodiments of the present invention, the second pivot 72 is removably secured to the power unit PA, PB. It is nonetheless possible to provide an arrangement, in which the second pivot 72 that is removably secured to the swing arm 70 is supported on the power unit PA, PB by being insertable and removable. Further, the second pivot 72 may be removably bolted to the power unit PA, PB or the swing arm 70 using a bolt or the like.

According to the foregoing embodiments of the present invention, the swing arm 70 is swingably supported on the power unit PA, PB via the first and the second shaft members 71, 72 split into right and left halves. It is nonetheless appropriate that the swing arm 70 be swingably supported on the power unit PA, PB via a single shaft member that passes through the power unit PA, PB.

The swing arm support means for swingably supporting the swing arm 70 may be the vehicle body frame, instead of the power unit PA, PB.

Further, the shaft holding member 97 may be manufactured through press forming, though the shaft holding member 97 according to the foregoing embodiment of the present invention is a casting or other type of molding.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A structure for supporting a swing arm in a motorcycle, in which a power unit mounted on a vehicle body frame swingably supports a front portion of a swing arm via a first pivot member of a cylindrical shape coaxial with an output shaft and a second pivot member coaxial with the first pivot, a rear portion of the swing arm journals a rear wheel, the power unit including an engine and a reduction transmission apparatus that includes the output shaft for supplying a driving force to the rear wheel, the reduction transmission apparatus is provided for transmitting an output of the engine through speed reduction, comprising:

an outer end portion of said output shaft projecting outwardly from the swing arm and being operatively connected to a final transmission member of the reduction transmission and being capable of removal or insertion in an axial direction, while being incapable of relative rotation about an axis;

said first pivot member being removably mounted on the power unit; and said second pivot member being removably secured to the power unit or the swing arm, wherein the second pivot member is coaxial with the first pivot member and the first and second pivot members are disposed coaxially with the output shaft, and wherein an end portion of the first pivot member adjacent to the gear case includes a flange portion that is removable joined to the transmission apparatus such that the first pivot member can be removed by removing the flange portion and sliding the first pivot member in the axial direction.

2. A structure for supporting a swing arm in a motorcycle, in which a power unit mounted on a vehicle body frame swingably supports a front portion of a swing arm via a first pivot of a cylindrical shape coaxial with an output shaft and a second pivot coaxial with the first pivot, a rear portion of the swing arm journals a rear wheel, the power unit including an engine and a reduction transmission apparatus that includes the output shaft for supplying a driving force to the rear wheel, the reduction transmission apparatus is provided for transmitting an output of the engine through speed reduction, comprising:

an outer end portion of said output shaft projecting outwardly from the swing arm and being operatively connected to a final transmission member of the reduction transmission and being capable of removal or insertion in an axial direction, while being incapable of relative rotation about an axis;

said first pivot being removably mounted on the power unit; and said second pivot being removably secured to the power unit or the swing arm, wherein the second pivot is removably secured to the power unit or the swing arm by being disengageable axially from the power unit in a fixing released condition.

3. The structure for supporting a swing arm in a motorcycle according to claim 1, wherein the swing arm is molded integrally.

4. The structure for supporting a swing arm in a motorcycle according to claim 2, wherein the swing arm is molded integrally.

5. The structure for supporting a swing arm in a motorcycle according to claim 1, wherein an output shaft holder for rotatably supporting the outer end portion of the output shaft is removably mounted on a front portion of the swing arm so as to cover the outer end portion of the output shaft.

6. The structure for supporting a swing arm in a motorcycle according to claim 2, wherein an output shaft holder for rotatably supporting the outer end portion of the output shaft is removably mounted on a front portion of the swing arm so as to cover the outer end portion of the output shaft.

7. The structure for supporting a swing arm in a motorcycle according to claim 3, wherein an output shaft holder for rotatably supporting the outer end portion of the output shaft is removably mounted on a front portion of the swing arm so as to cover the outer end portion of the output shaft.

8. A structure for supporting a swing arm in a motorcycle, in which a power unit mounted on a vehicle body frame swingably supports a front portion of a swing arm via a first pivot of a cylindrical shape coaxial with an output shaft and a second pivot coaxial with the first pivot, a rear portion of the swing arm journals a rear wheel, the power unit including an engine and a reduction transmission apparatus that includes the output shaft for supplying a driving force to the rear wheel, the reduction transmission apparatus is provided for transmitting an output of the engine through speed reduction, comprising:

an outer end portion of said output shaft projecting outwardly from the swing arm and being operatively connected to a final transmission member of the reduction transmission and being capable of removal or insertion in an axial direction, while being incapable of relative rotation about an axis;

said first pivot being removably mounted on the power unit; and said second pivot being removably secured to the power unit or the swing arm, wherein a pivot holder capable of fixedly holding an outer end portion of the second pivot that passes through the swing arm and is screwed in the power unit is removably mounted onto a plurality of boss portions disposed in the power unit at a portion outside a swing motion range of the swing arm.

9. The structure for supporting a swing arm in a motorcycle according to claim 2, wherein a pivot holder capable of fixedly holding an outer end portion of the second pivot that passes through the swing arm and is screwed in the power unit is removably mounted onto a plurality of boss portions disposed in the power unit at a portion outside a swing motion range of the swing arm.

10. The structure for supporting a swing arm in a motorcycle according to claim 3, wherein a pivot holder capable of fixedly holding an outer end portion of the second pivot member that passes through the swing arm and is screwed in the power unit is removably mounted onto a plurality of boss portions disposed in the power unit at a portion outside a swing motion range of the swing arm.

11. The structure for supporting a swing arm in a motorcycle according to claim 4, wherein a pivot holder capable of fixedly holding an outer end portion of the second pivot that passes through the swing arm and is screwed in the power unit is removably mounted onto a plurality of boss portions disposed in the power unit at a portion outside a swing motion range of the swing arm.

12. A structure for supporting a swing arm in a motorcycle including a pair of right and left support arm portions extending forwardly and disposed at a front portion of a swing arm with a rear wheel journaled in a rear portion, the pair of right and left support arm portions being swingably supported on swing arm support means disposed therebetween via shaft members, comprising:

an outer end portion of the shaft member passing through at least one of the pair of right and left support arm portions being held by a shaft holding member removably mounted on the swing arm support means, wherein the shaft holding member is formed substantially into a circular shape so as to let the outer end portion of the shaft member pass therethrough and includes a holding portion having a slit at one circumferential place therein, and wherein the shaft member is held in position by the shaft holding member by tightening a bolt that traverses the slit and is screwed in the holding portion.

13. The structure for supporting a swing arm in a motorcycle according to claim 12, wherein the swing arm support means include a power unit mounted in a vehicle body frame so as to drive the rear wheel.

14. The structure for supporting a swing arm in a motorcycle according to claim 12, wherein the swing arm support means include a plurality of boss portions for removably mounting the shaft holding member; and
   wherein, of the boss portions, the boss portion that overlaps with the swing arm in a top view thereof is disposed at a position that falls outside a range of swing motion of the swing arm.

15. A structure for supporting a swing arm in a motorcycle including a pair of right and left support arm portions extending forwardly and disposed at a front portion of a swing arm with a rear wheel journaled in a rear portion, the pair of right and left support arm portions being swingably supported on swing arm support means disposed therebetween via shaft members, comprising:
   an outer end portion of the shaft member passing through at least one of the pair of right and left support arm portions being held by a shaft holding member removably mounted on the swing arm support means,
   wherein the swing arm support means include a plurality of boss portions for removably mounting the shaft holding member,
   wherein, of the boss portions, the boss portion that overlaps with the swing arm in a top view thereof is disposed at a position that falls outside a range of swing motion of the swing arm, and
   wherein at least part of the plurality of boss portions is disposed in the swing arm support means so as to project outwardly from the swing arm.

16. A structure for supporting a swing arm in a motorcycle including a pair of right and left support arm portions extending forwardly and disposed at a front portion of a swing arm with a rear wheel journaled in a rear portion, the pair of right and left support arm portions being swingably supported on swing arm support means disposed therebetween via shaft members, comprising:
   an outer end portion of the shaft member passing through at least one of the pair of right and left support arm portions being held by a shaft holding member removably mounted on the swing arm support means,
   wherein the swing arm support means include a plurality of boss portions for removably mounting the shaft holding member,
   wherein, of the boss portions, the boss portion that overlaps with the swing arm in a top view thereof is disposed at a position that falls outside a range of swing motion of the swing arm,
   wherein at least either one of a pair of the boss portions disposed in the swing arm support means at a position sandwiching the swing arm from upper and lower directions thereof includes a plurality of fastening seats for fastening the shaft holding member, and
   wherein a position of each of the fastening seats is mounted wherein a distance from a center of the shaft member to each of the fastening seats is smaller with a forwardly positioned fastening seats.

* * * * *